(12) United States Patent
David et al.

(10) Patent No.: US 10,571,342 B1
(45) Date of Patent: Feb. 25, 2020

(54) ACCLIMATION PROCESS

(71) Applicant: International Business Machines Corporation, Armonk, NY (US)

(72) Inventors: Milnes David, New Paltz, NY (US); William J. Green, Cary, NC (US); Joseph Prisco, Rochester, MN (US); Robert T. Sanders, Raleigh, NC (US); Sharon T. Spaulding, Highland, NY (US); Hemphill M. Timothy, Wake, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/107,286

(22) Filed: Aug. 21, 2018

(51) Int. Cl.
*G08B 17/00* (2006.01)
*G01K 3/04* (2006.01)
*G06K 19/07* (2006.01)
*G06Q 10/08* (2012.01)

(52) U.S. Cl.
CPC .......... *G01K 3/04* (2013.01); *G06K 19/0717* (2013.01); *G06Q 10/0832* (2013.01)

(58) Field of Classification Search
None
See application file for complete search history.

(56) References Cited

U.S. PATENT DOCUMENTS

| 7,248,147 | B2 | 7/2007 | Debord et al. | |
|---|---|---|---|---|
| 2009/0139457 | A1* | 6/2009 | Luong | A01K 63/006 119/251 |
| 2015/0039528 | A1* | 2/2015 | Minogue | G06Q 10/0832 705/332 |
| 2019/0160994 | A1* | 5/2019 | Letson | B60P 3/20 |

OTHER PUBLICATIONS

Carob Apps, LLC, "inRoute Route Planner on the App Store", Online Retrieved 2018, URL<https://itunes.apple.com/us/app/inroute-route-planner-gps/id703796787?mt=8>, 3 pages.
Condliffe, "Road Trip Planner Lets You Choose a Route With the Best Weather", Online Retrieved 2018, URL:<http://gizmodo.com/5919495/road-trip-planner-lets-you-choose-a-route-with-the-best-weather>, 3 pages.
David et al., "Environmental acclimation of computing systems", ITherm, 2016, 2 pages.

* cited by examiner

*Primary Examiner* — Julie B Lieu
(74) *Attorney, Agent, or Firm* — Cantor Colburn LLP; Thion Poltavets (57) ABSTRACT

An advisory element of an acclimation system for an item being shipped from a source to a destination is provided with the item being disposable in a polybag. The advisory element is attachable to or is disposable remotely from the polybag. The advisory element is configured to receive shipment information input at the source, to sense environmental conditions to which the item and the polybag are exposed during shipment and at the destination and to calculate an acclimation time for the item based on the shipment information and the sensed environmental condi- (Continued)

tions. The advisory element is further configured to provide operational guidance to a user in accordance with the acclimation time at the destination.

20 Claims, 6 Drawing Sheets

ACCLIMATION PROCESS

BACKGROUND

The present invention generally relates to an acclimation process, and more specifically, to a cold weather shipping and acclimation process and a dashboard for business use.

In certain situations, large computing devices are packaged and shipped in plastic bags, known as "polybags." During shipment and delivery, the polybag-encased computing devices are exposed to various temperatures that can range from very cold to slightly elevated. In such cases, it is often the case that the computing devices are exposed to moisture once they are delivered if they have been kept cold during shipment and the polybags are opened in a hot, moist environment. It is possible that this exposure to moisture can result in the computing devices being negatively affected, due to condensation forming on vital electronic components. To the extent that the computing devices can be expensive, the negative effects can be costly.

SUMMARY

Embodiments of the present invention are directed to an advisory element of an acclimation system for an item being shipped from a source to a destination with the item being packaged in a polybag. A non-limiting example of the advisory element is attachable to or is disposable remotely from the polybag. The non-limiting example of the advisory element is configured to receive shipment information input at the source, to sense environmental conditions to which the item and the polybag are exposed during shipment and at the destination and to calculate an acclimation time for the item based on the shipment information and the sensed environmental conditions. The non-limiting example of the advisory element is further configured to provide operational guidance to a user in accordance with the acclimation time at the destination.

Embodiments of the present invention are directed to an acclimation system for an item being shipped from a source to a destination. A non-limiting example of the acclimation system includes a polybag into which the item is disposable and an advisory element. The advisory element is attachable to the polybag at the source or is disposable remotely from the polybag. The advisory element is configured to receive shipment information input at the source, to sense environmental conditions to which the item and the polybag are exposed during shipment and at the destination, to calculate an acclimation time for the item based on the shipment information and the sensed environmental conditions and to provide operational guidance to a user in accordance with the acclimation time at the destination.

Embodiments of the invention are directed to a method of managing a shipment of an item from a source to a destination with the shipment disposed in a polybag. A non-limiting example of the method is executable by an advisory element that is attachable to the polybag at the source or disposable remotely from the polybag. The non-limiting example of the method includes receiving shipment information input at the source, sensing environmental conditions to which the item and the polybag are exposed during shipment and at the destination and calculating an acclimation time for the item based on the shipment information and the sensed environmental conditions. The non-limiting example of the method further includes providing operational guidance to a user in accordance with the acclimation time at the destination.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, expensive computing devices are often packaged and shipped in polymer or plastic bags (hereinafter referred to as "polybags") and then exposed to various environmental conditions, such as cold temperatures. Once delivery is made, if the polybags are opened in an environment in which the temperature is substantially different from the temperature it was previously exposed to, the computing devices can be exposed to moisture. If, at this point, the computing devices are turned on, the moisture can interfere with their electrical components and result in damage or even complete losses.

While items that are shipped are often provided with various sensors to sense and track exposure of the items to various environmental conditions, the sensors do not have the capability of providing advice and guidance to users once delivery is made. The users are therefore usually on their own to remove the items from the shipping packaging and then to subsequently operate them. As a result, the users are likely to discount the risks associated with prematurely removing items from shipping packaging or with prematurely operating those items following removal. This is particularly problematic in the case of the items being very expensive computing devices where the users would be advised to delay removal from the polybags and to delay turning the computing devices on following the removal.

Turning now to an overview of the aspects of the invention, one or more embodiments of the invention address the above-described shortcomings of the prior art by providing for a system and a method of predicting a time needed for acclimation of a computing device that has been packaged and shipped in a polybag to an indoor environment following exposure to a cold weather shipping environment.

The above-described aspects of the invention address the shortcomings of the prior art by determining an environmental acclimation time of a shipment based on physical aspects of the shipment, initial conditions of the shipment that were encountered during packaging, shipping conditions, final destination conditions and various functional mathematical relationships. The physical aspects can include weight, dimensions, density, shipping materials and shipping container dimensions. The initial, shipping and destination environmental conditions can include location, temperature, humidity and altitude information and the shipping conditions can be continuously monitored and recorded or fully determined using weather data and shipping route or real-time location information. The determining can be executed by an acclimation tool that can be provided as a program running remotely to the shipment or as an electronic device with local storage and sensors attached to the shipment.

Acclimation time can be split into two separate components: a time required before removal of a shipped item from its packaging and a time required before that shipped item can be operated.

Figure 1:
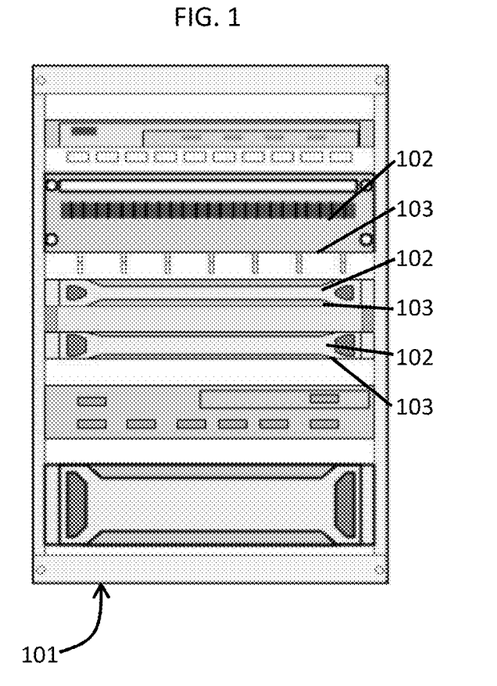
FIG. 1 depicts a computing device in accordance with embodiments of the present invention.

Turning now to a more detailed description of aspects of the present invention, FIG. 1 depicts a computing device 101 in accordance with embodiments of the present invention. As shown in FIG. 1, the computing device 101 can be provided as any type of host or client computer. For example, the computing device 101 can be a rackmount server system with multiple server elements 102 provided on multiple shelves 103 in a vertical arrangement. In any case, the computing device 101 can be initially stored at a source location for eventual packaging and subsequent shipment to a destination that can be geographically distant from the source. As such, shipment and transportation modes for shipping the computing device 101 can include ground-, naval- or air-based transportation modes that will tend to expose the computing device 101 and its packaging to varying environmental conditions that can be predicted to varying degrees of accuracy or unpredictable.

In any case, the computing device 101 can be relatively expensive and costly to repair in an event of damage occurring during shipment or in an event of user error during the removal of the computing device 101 from its packaging at the destination.

Figure 2:
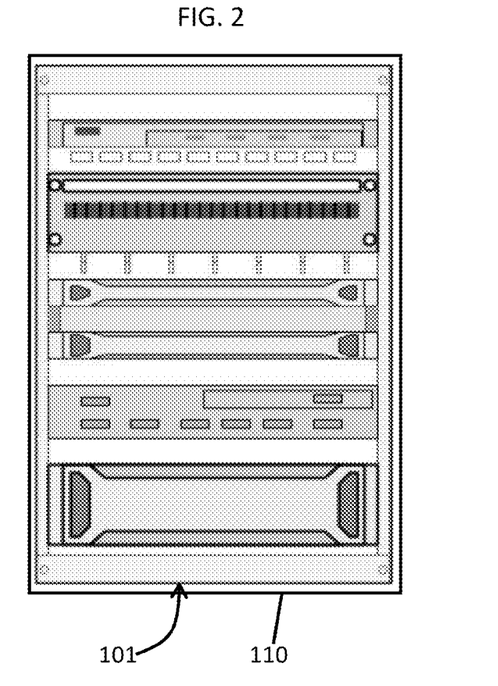
FIG. 2 depicts the computing device of FIG. 1 being packaged in a polymer bag in accordance with embodiments of the present invention.

FIG. 2 depicts the computing device 101 of FIG. 1 being packaged in a polymer bag or a polybag 110 in accordance with embodiments of the present invention. The polybag 110 can be made of one or more polymers and surrounds the computing device 101 on all six sides (i.e., front, back, top, bottom, left and right sides). The polybag 110 can be, but is not required to be, hermetically sealed. Additionally or alternatively, the polybag 110 can be permeable or slightly permeable to at least one of air and moisture.

In some embodiments, the polybag 110 can also include a laminated metallic (e.g., aluminum) layer to increase certain barrier properties of the film. For purposes of clarity and brevity, the following discussion will refer to the polybag 110 but it will be understood that this reference will incorporate those cases in which the polybag 110 includes one or more polymer layers as well as those cases in which the polybag 110 further includes one or more laminated metallic layers as well.

Figure 3:
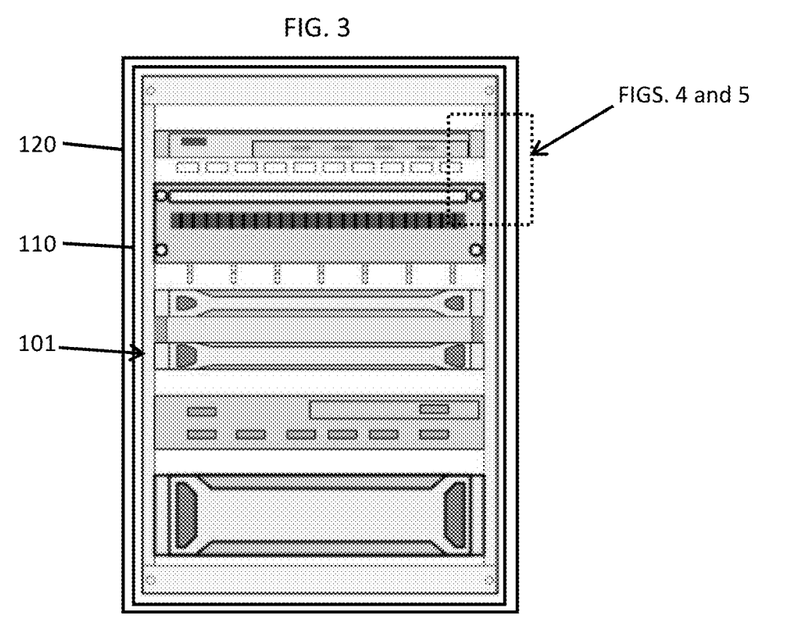
FIG. 3 depicts the computing device and the polymer bag of FIG. 2 being packaged in an outer package in accordance with embodiments of the present invention.

FIG. 3 depicts the computing device 101 and the polybag 110 of FIG. 2 being packaged in an outer package 120 in accordance with embodiments of the present invention. The outer package 120 can be made of various rigid or semi-rigid structural materials and surrounds the computing device 101 and the polybag 110 on all six sides (i.e., front, back, top, bottom, left and right sides). The outer package 120 can be, but is not required to be, hermetically sealed. Additionally or alternatively, outer package 120 can be permeable or slightly permeable to at least one of air and moisture.

As shown schematically in FIG. 3, the outer package 120 forms a space 121 between an interior surface thereof and the polybag 110. As the outer package 120 can be permeable or slightly permeable, the space 121 can be substantially provided at external atmospheric conditions.

Figure 4:
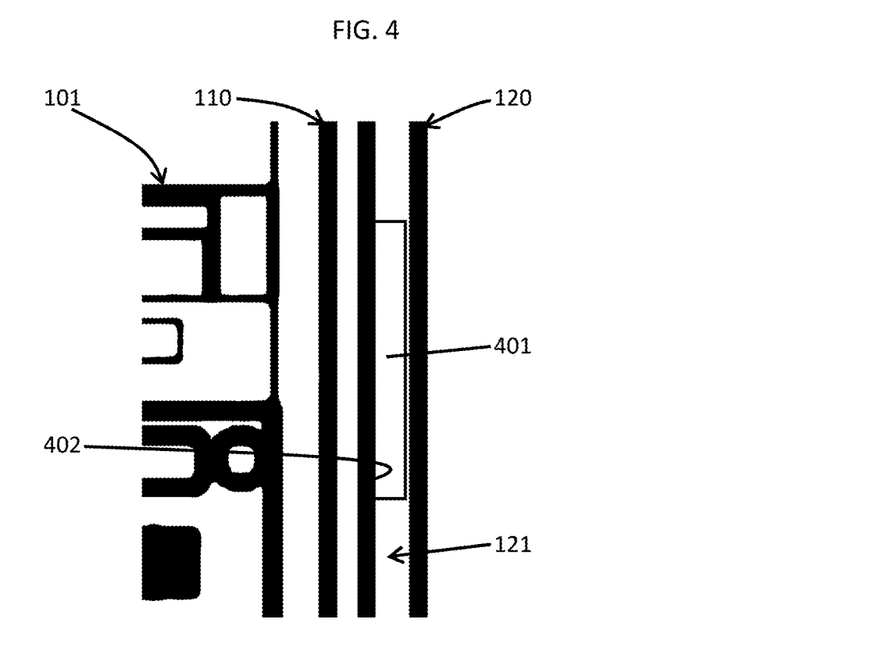
FIG. 4 is a schematic side view of an advisory element disposed to receive shipment information input, to sense environmental conditions around the polymer bag of FIGS. 2 and 3 and to provide guidance to a user in accordance with embodiments of the present invention.

FIG. 4 is a schematic side view of an advisory element 401. As will be described below, the advisory element 401 is disposed to receive shipment information input, to sense environmental conditions around the polybag 110 (i.e., in the space 121 and/or regions at an exterior of the outer package 120) and to provide guidance to a user in accordance with embodiments of the present invention. The advisory element 401 is attachable to the polybag 110 by way of various attachments features 402 that include, but are not limited to, magnetic attraction features and adhesive.

Figure 5:
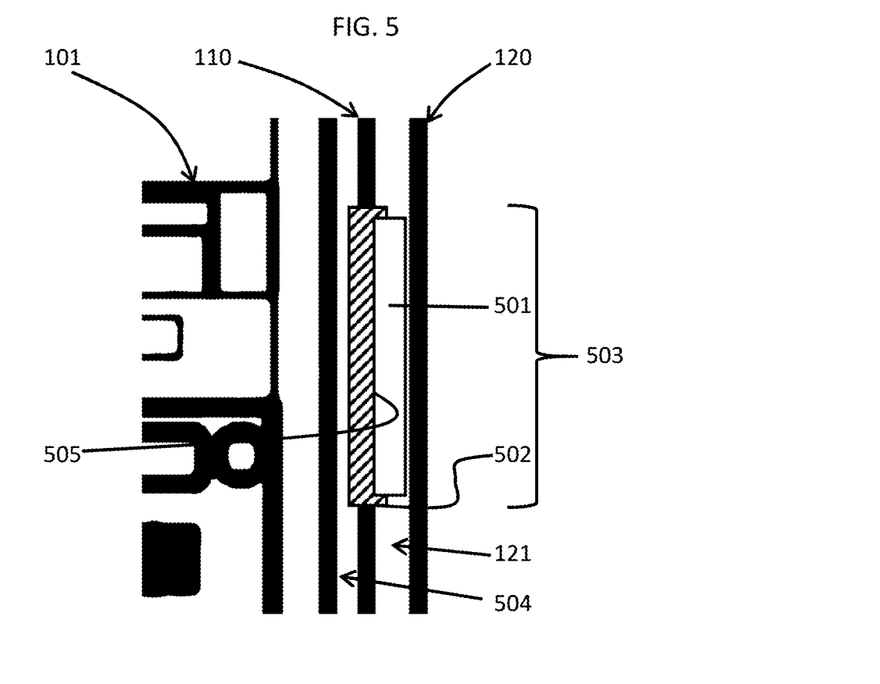
FIG. 5 is a schematic side view of an advisory element disposed to receive shipment information input, to sense environmental conditions around the polymer bag of FIGS. 2 and 3 and to provide guidance to a user in accordance with further embodiments of the present invention.

FIG. 5 is a schematic side view of an advisory element 501. As will be described below, the advisory element 501 is disposed to receive shipment information input, to sense environmental conditions around the polybag 110 (i.e., in the space 121 and/or regions at an exterior of the outer package 120) and to provide guidance to a user in accordance with embodiments of the present invention. The advisory element 501 is attachable to a gasket 502, which is attached to the polybag 110 about an aperture 503 defined by the polybag 110. In this way, sensing capabilities of the advisory element 501 have access to regions around the polybag 110 and to interior space 504 between the polybag 110 and the computing device 101. The attachment of the advisory element 501 to the gasket 502 can be achieved by way of various attachments features 505 that include, but are not limited to, magnetic attraction features and adhesive.

Figure 6:
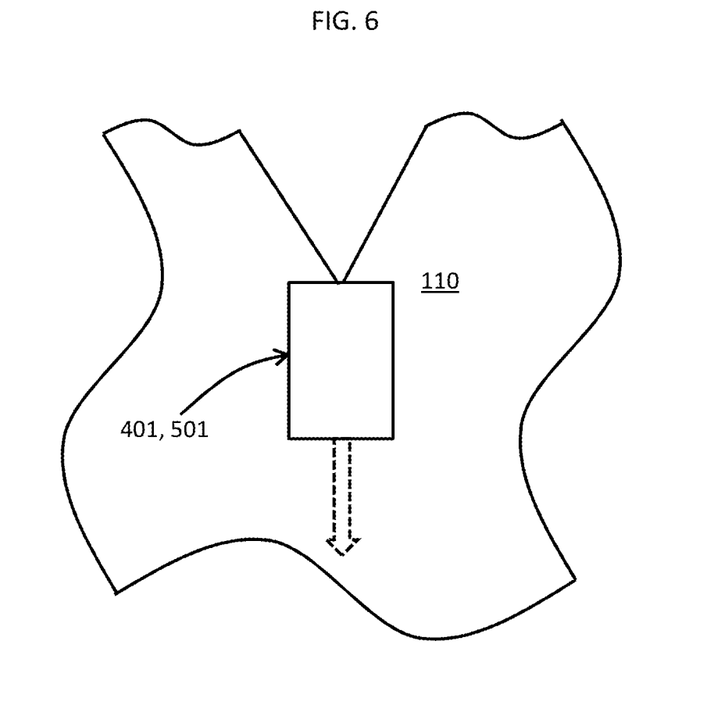
FIG. 6 is a schematic illustration of a polybag-opening operation of the advisory element of FIGS. 4 and 5 in accordance with further embodiments of the present invention.

FIG. 6 is a schematic illustration of a polybag-opening operation of the advisory elements 401 and 501 of FIGS. 4 and 5, respectively, in accordance with further embodiments of the present invention. As shown in FIG. 6, the advisory elements 401 and 501 can be configured to cut through the polybag 110 either as a result of user manipulation (e.g., by moving the advisory elements 401 and 501 as illustrated by the arrow) or automatically (e.g., where the advisory elements 401 and 501 include a cutting tool that cuts through the polybag 110) when it is appropriate to do so as described below.

Figure 7:
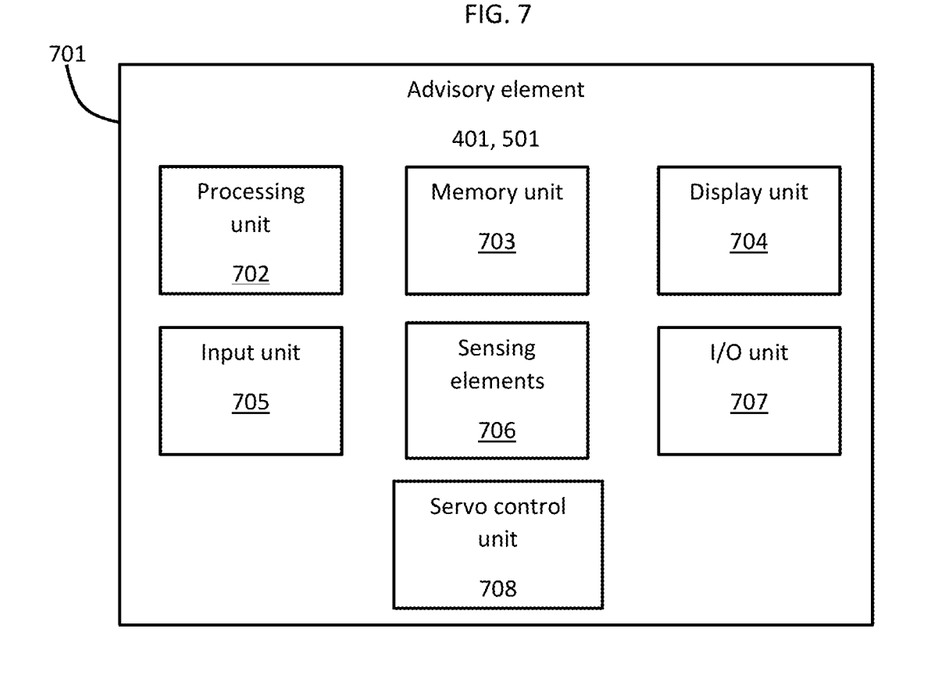
FIG. 7 is a schematic diagram illustrating components of the advisory elements of FIGS. 4, 5 and 6 in accordance with embodiments of the present invention.

FIG. 7 is a schematic diagram illustrating components of the advisory elements of FIGS. 4, 5 and 6 in accordance with embodiments of the present invention in which the advisory elements 401 and 501 are attachable to the polybag 110. As shown in FIG. 7, the advisory elements 401 and 501 include a housing 701, which is attachable to the polybag 110 (or the gasket 502 of FIG. 5) by magnetic attraction or adhesion, processing unit 702, a memory unit 703, a display unit 704, an input unit 705, sensing elements 706, an input/output (I/O) unit 707 and a servo control unit 708. The processing unit 702, the memory unit 703, the I/O unit 707 and the servo control unit 708 can be housed in the housing 701. The display unit 704, the input unit 705 and the sensing elements 706 can be supportively disposed on or as part of the housing 701. The input unit 705 can be provided as a tangible or virtual keyboard and can be provided, in the latter case in particular, within the display unit 704. The sensing elements 706 can be configured to sense various atmospheric conditions such as, but not limited to, surrounding temperatures, humidity, and accelerations (i.e., accelerations resulting from impacts). The I/O unit 707 manages flows of data and information among the processing unit 702, the memory unit 703, the display unit 704, the input unit 705, the sensing elements 706 and the servo control unit 708. The servo control unit 708 can be configured to control operations of physical features of the advisory elements 401 and 501 such as, but not limited to, the cutting tool described above with reference to FIG. 6.

The memory unit 703 has executable instructions stored thereon which are readable and executable by the processing unit 702. When the executable instructions are read and executed by the processing unit 702, the executable instructions cause the processing unit 702 to execute a method of managing a shipment of an item disposed in the polybag 110 from a source location to a destination location.

Although the advisory elements 401 and 501 are described herein as being attachable to the polybag 110 and shipped with the item, it is to be understood that advisory elements can also be embodied as remote elements that do not travel with the item. In these cases, the remote advisory elements can be provided as applications running on remote or local servers or client computers or as applications running on portable computing devices, such as smartphones and tablets (in order to retrieve environmental conditions, the remote advisory elements can communicate with local or embedded sensing elements or can download environmental condition data), and are capable of executing the method of managing a shipment of an item disposed in the polybag 110 from a source location to a destination location.

Figure 8:
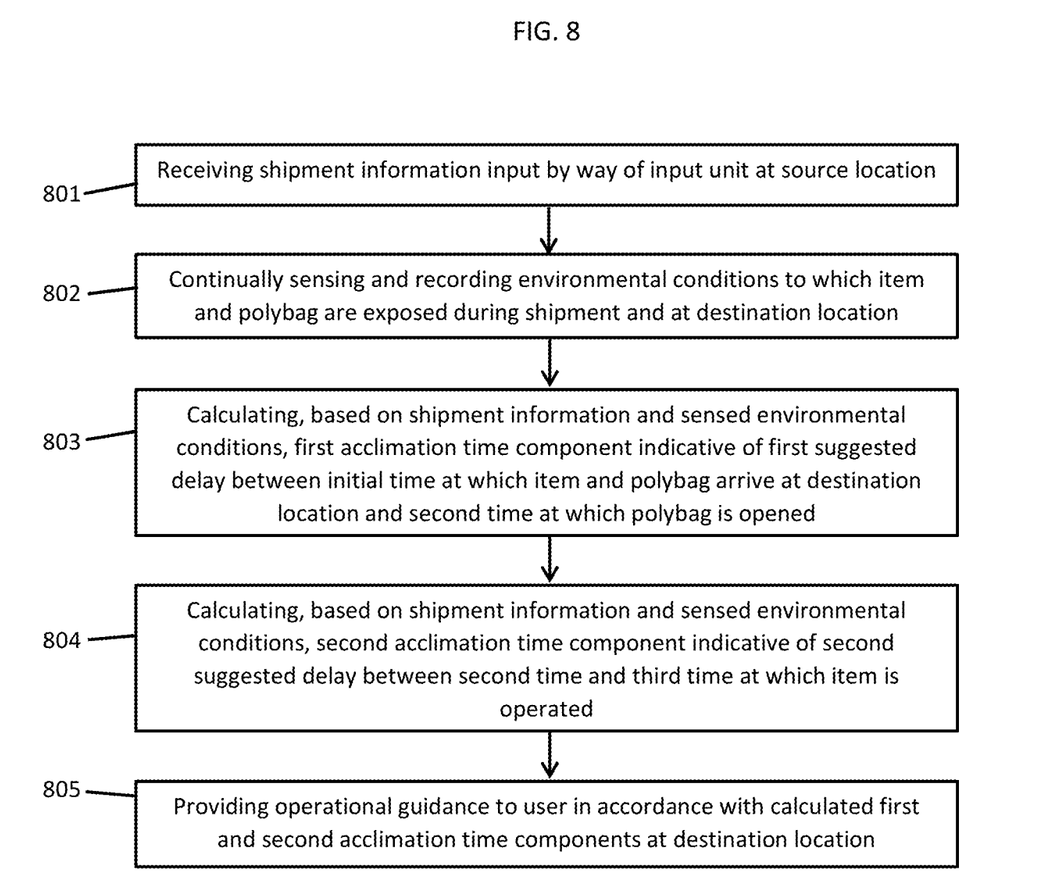
FIG. 8 is a flow diagram illustrating a method of managing a shipment of an item from a source to a destination where the shipment is disposed in a polybag in accordance with embodiments of the present invention.

With reference to FIG. 8, the method of managing a shipment of an item from a source location to a destination location where the shipment is disposed in the polybag 110 initially includes receiving shipment information input automatically or by way of the input unit 705 (or a virtualized input unit 705 of the display unit 704) at the source location (801). The method also includes continually sensing and recording environmental conditions to which the item and the polybag 110 are exposed during shipment and at the destination location by the sensing elements 706 (802). In addition, the method includes calculating, by the processing unit 702 based on the shipment information and the sensed environmental conditions, a first acclimation time component to be indicative of a first suggested delay between an initial time at which the item and the polybag 110 arrive at the destination location and a second time at which the polybag 110 is to be opened (803). The method also includes calculating, by the processing unit 702 based on the shipment information and the sensed environmental conditions, a second acclimation time component to be indicative of a second suggested delay between the second time and a third time at which the item is to be operated (804). At this point, the method includes providing operational guidance by way of the display unit 704 (in the case of the advisory elements 401 and 501 being local) or by way of other display units (in the case of the method being executed on a remote device) to a user in accordance with the calculated first and second acclimation time components at the destination location (805).

In accordance with embodiments, the shipment information can include physical characteristics of the item being shipped such as weight, dimensions, density, shipping materials to be used and dimensions of a shipping container to be used. The shipment information can also include source location information, shipping route information, destination location information and temperature, humidity and altitude readings for each. The shipment information can be input via the input unit 705 by a user, input via a machine-readable code that is pre-coded with relevant data and read by a suitable reader or downloaded. The temperature, humidity and altitude readings can be derived from continual or periodic sensor readings or from publicly available environmental conditional data which is associated with the source location, the shipping route and the destination location.

In accordance with embodiments, the first acclimation time component can be calculated from the physical make-up of the shipment, the pshycrometric history of the shipment and the initial and destination environmental conditions to ensure that condensation does not directly form on the shipment. The calculation could be achieved using Newton's laws of heating and cooling and the use of effective thermal time constants empirically determined for the shipment based on its physical make-up. The second acclimation time component can be determined from the physical make-up of the shipment, the pshycrometric history of the shipment and the initial and destination environmental conditions to ensure that the shipment is dry and safe to power-on. The calculation could be achieved using empirically derived drying-times based on humidity and temperature readings or by using evaporation and condensation models along with diffusion models, such as Fick's law of diffusion, to theoretically determine the amount of time necessary for the shipment to dry given the initial, shipping and final environmental conditions.

Figure 9:
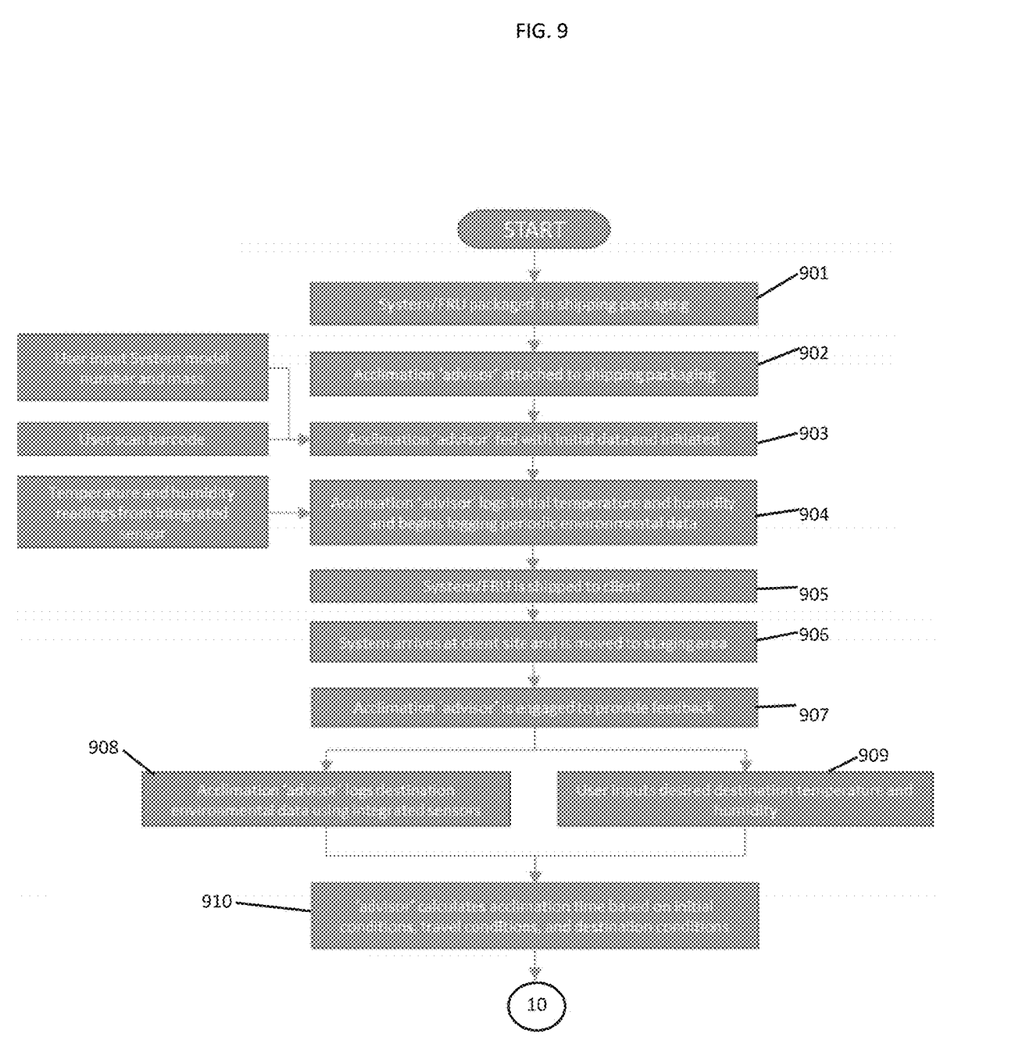
FIG. 9 is a flow diagram illustrating an acclimation process in accordance with embodiments of the present invention.
Figure 10:
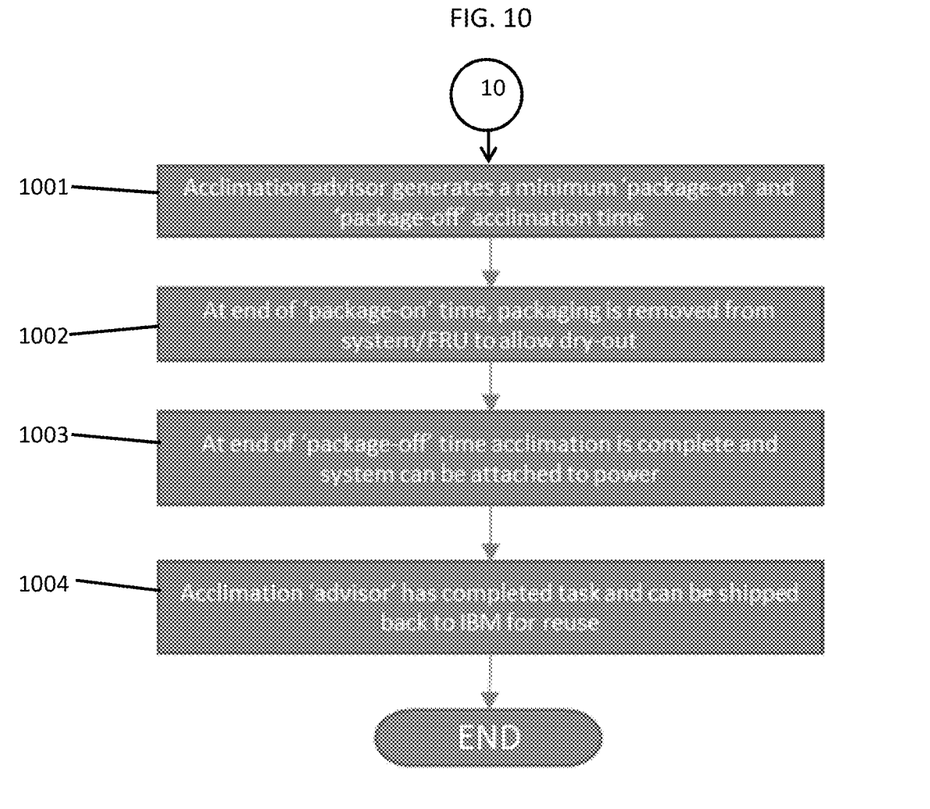
FIG. 10 is a flow diagram illustrating an operation of an advisory element in accordance with embodiments of the present invention.

FIG. 9 is a flow diagram illustrating an acclimation process in accordance with embodiments of the present invention and FIG. 10 is a flow diagram illustrating an operation of an advisory element in accordance with embodiments of the present invention.

As shown in FIG. 9, the application process includes a packaging operation, in which an item to be shipped (i.e., a computing device) is packaged (i.e., in a polybag) for shipping (901), which is followed by an advisory element being attached to the packaging (902). The advisory element is fed within initial data and initiated (903) whereupon the advisory element logs initial temperature and humidity from initial temperature and humidity readings and begins to continually or periodically log environmental data and information (904). The initial data can include a system model number and its mass and can be fed into the advisory element manually or as information associated with a scanned barcode. Shipping toward the destination location follows (905) until the destination location is reached (906) and the advisory element is engaged (907). The advisory element then logs destination environmental conditions by way of automatic sensing (908) or user inputs (909) and the advisory element calculates the above-noted first and second acclimation time components (910).

The calculation of the first acclimation time component can include a generation of an internal thermal history of the item and the polybag. The thermal history can be expressed by the following equation:

$$T_{internal, time=t} = T_{amb} + (T_{internal, time=0} - T_{amb}) \exp\left(\frac{t}{t_c}\right) \quad \text{Equation 1}$$

where Tamb is the ambient temperature around the system, Tinternal,time=t is the predicted temperature at time t at some pre-determined reference point within the equipment, Tinternal,time=0 is the internal temperature at same reference point at the beginning of the shipping process when time=0, and tc is the thermal time constant of the package based on its mass, effective density, effective heat capacity and environmental warming characteristics.

From the thermal history, the calculation includes a calculation of a destination dew point temperature, $T_{dp}$, based on temperature, $T_{dest}$, and humidity conditions at the destination location and a determination of whether a current internal temperature exceeds the dew point temperature of the destination location. If not, a time of the internal system temperature to exceed the destination dew point is calculated for display as a countdown timer by the following equation where t effectively serves as the first time acclimation component:

$$t = -2 \times t_c \times \ln\left(\frac{T_{dp} - T_{dest}}{T_{internal, time=0} - T_{dest}}\right) \quad \text{Equation 2}$$

The calculation of the second acclimation time component can include a psychrometric moisture calculation, can rely on evaporation/condensation models with machine-based correction factors or can rely on moisture diffusion models with machine-based correction factors. Again, the result of the calculation can be displayed as a countdown timer, although it is to be understood that the user or an automatic sensing system can inspect the item for dryness or otherwise determine that the item has dried once the countdown timer reaches zero for the second acclimation time component to insure that sufficient drying time has been provided.

As shown in FIG. 10, once the advisory element calculates the first and second acclimation time components, the advisory element generates a set of minimum "package-on" and "package-off" acclimation time suggestions (1001) based on the calculated first and second acclimation time components. At an end of the "package-on" acclimation time, the item being shipped is removed from the packaging and allowed to dry out (1002). At an end of the "package-off" acclimation time, the item can be powered on (1003) and the advisory element can be returned (1004).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An advisory element of an acclimation system for an item being shipped from a source to a destination with the item being disposable in a polybag,
the advisory element being attachable to or disposable remotely from the polybag, and
the advisory element being configured to:
receive shipment information input at the source,
sense environmental conditions to which the item and the polybag are exposed during shipment and at the destination,
calculate an acclimation time for the item based on the shipment information and the sensed environmental conditions, and
provide operational guidance to a user in accordance with the acclimation time at the destination.

2. The advisory element according to claim 1, wherein the advisory element is one of magnetically attachable to the polybag and configured for adhesion to the polybag.

3. The acclimation system according to claim 1, wherein the polybag is formed to define an aperture with a gasket and the advisory element is attachable to the polybag at the gasket.

4. The acclimation system according to claim 1, wherein the advisory element is further configured to automatically open the polybag in accordance with the acclimation time.

5. The acclimation system according to claim 1, wherein the shipment information comprises physical characteristics of the item and initial shipping and destination conditions.

6. The acclimation system according to claim 1, wherein at least a portion of the shipment information is at least one of manually input and automatically input into the advisory element.

7. The acclimation system according to claim 1, wherein the advisory element continually senses and records the environmental conditions during the shipment and at the destination.

8. The acclimation system according to claim 1, wherein the acclimation time is calculated to comprise:
a first acclimation time component to be indicative of a first suggested delay between an initial time at which the item and the polybag arrive at the destination and a second time at which the polybag is to be opened, and
a second acclimation time component to be indicative of a second suggested delay between the second time and a third time at which the item is to be operated.

9. The acclimation system according to claim 8, wherein the operational guidance comprises a display of at least one of the first acclimation time component and the second acclimation time component.

10. An acclimation system for an item being shipped from a source to a destination, the acclimation system comprising:
a polybag into which the item is disposable; and
an advisory element, which is attachable to or disposable remotely from the polybag, and being configured to:
receive shipment information input at the source,
sense environmental conditions to which the item and the polybag are exposed during shipment and at the destination,
calculate an acclimation time for the item based on the shipment information and the sensed environmental conditions, and
provide operational guidance to a user in accordance with the acclimation time at the destination.

11. The acclimation system according to claim 10, wherein the advisory element is one of magnetically attachable to the polybag and configured for adhesion to the polybag.

12. The acclimation system according to claim 10, wherein the polybag is formed to define an aperture with a gasket and the advisory element is attachable to the polybag at the gasket.

13. The acclimation system according to claim 10, wherein the advisory element is further configured to automatically open the polybag in accordance with the acclimation time.

14. The acclimation system according to claim 10, wherein the shipment information comprises physical characteristics of the item and initial shipping and destination conditions.

15. The acclimation system according to claim 10, wherein at least a portion of the shipment information is at least one of manually input and automatically input into the advisory element.

16. The acclimation system according to claim 10, wherein the advisory element continually senses and records the environmental conditions during the shipment and at the destination.

17. The acclimation system according to claim 10, wherein the acclimation time is calculated to comprise:
a first acclimation time component to be indicative of a first suggested delay between an initial time at which the item and the polybag arrive at the destination and a second time at which the polybag is to be opened, and
a second acclimation time component to be indicative of a second suggested delay between the second time and a third time at which the item is to be operated.

18. The acclimation system according to claim 17, wherein the operational guidance comprises a display of at least one of the first acclimation time component and the second acclimation time component.

19. A method of managing a shipment from a source to a destination of an item that is disposed in a polybag from a source to a destination,
the method being executable by an advisory element that is attachable to or disposable remotely from the polybag, and
the method comprising:
receiving shipment information input at the source;
sensing environmental conditions to which the item and the polybag are exposed during shipment and at the destination;
calculating an acclimation time for the item based on the shipment information and the sensed environmental conditions; and
providing operational guidance to a user in accordance with the acclimation time at the destination.

20. The method according to claim 19, wherein the calculating of the acclimation time comprises:
calculating a first acclimation time component to be indicative of a first suggested delay between an initial time at which the item and the polybag arrive at the destination and a second time at which the polybag is to be opened, and
calculating a second acclimation time component to be indicative of a second suggested delay between the second time and a third time at which the item is to be operated.

* * * * *